L. B. PITCHER.
Plow-Colter.
No. 71,057. Patented Nov. 19, 1867.
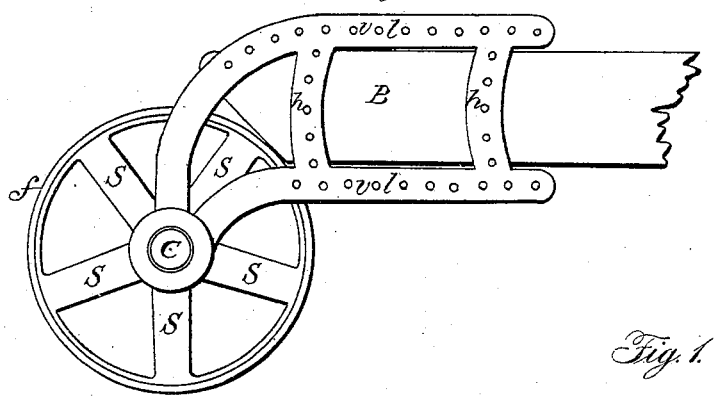
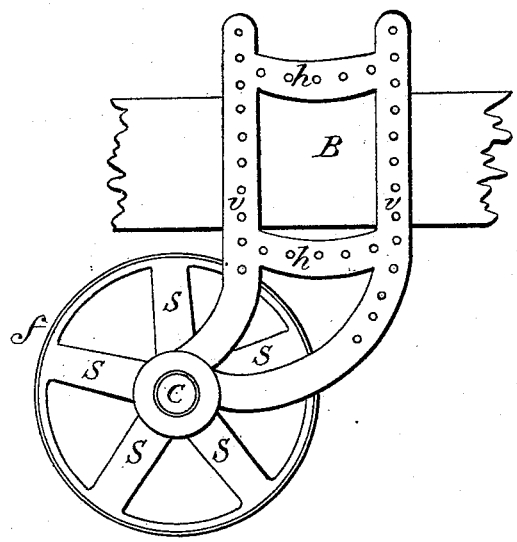
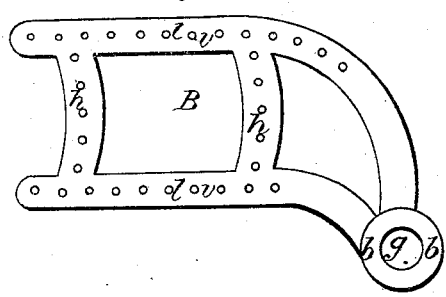
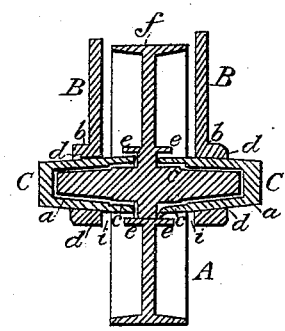
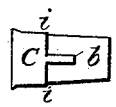
Witnesses:
N. B. Smith
C. W. Smith
Inventor:
Leman B. Pitcher

United States Patent Office.

LEMAN B. PITCHER, OF SALINA, NEW YORK.

Letters Patent No. 71,057, dated November 19, 1867.

---

IMPROVEMENT IN ROLLER-WHEELS FOR PLOUGHS.

---

The Schedule referred to in these Letters Patent and making part of the same.

---

TO ALL WHOM IT MAY CONCERN:

Be it known that I, LEMAN B. PITCHER, of the town of Salina, in the county of Onondaga, and State of New York, have invented a new and improved "Roller-Wheel for Ploughs and Cultivators," and the manner of mounting the same; and I do hereby declare that the following is a full, clear, and exact description of the construction of the same, and the mode of operation thereof when complete and ready for use, reference being had to the annexed drawings, forming a part of this specification, in which—

Figure 1 represents a perspective view of the roller when applied to a plough, and Figure 2 represents a like view when applied to a cultivator.

Figure 3 represents one of the segment-frames used on the roller, and

Figure 4 represents a cross-sectional view through the centre of the axle of the roller, showing also the situation of the protecting-cups and the attachment of the segment-frames.

Figure 5 represents a perspective view of the thimble-shaped cup.

The letters used represent corresponding parts wherever they occur.

I am aware that segments have been applied to rollers while used for cultivators and frames or braces to rollers used for ploughs, but not so constructed in either instance as to be serviceable alike for both ploughs and cultivators. My segment-frame can be used upon a roller while for a plough as well as cultivator. In the rollers in common use, the axles and bearings wear out very rapidly, because there is no sufficient protection against the dust and dirt. To obviate that difficulty, I place upon the shaft or axle a thimble-shaped cup, enclosing the end of the shaft, (as shown in the drawings,) which I have invented, and which, I claim, has a more extensive application than its use upon rollers, which are for ploughs and cultivators. It may be used to cover like bearings in harvesters, drills, threshing machines, and other machines or implements, where it is desirable to keep out the dust and dirt which usually increase the wear and friction. When the roller revolves on its own shaft a flange of suitable proportions may be made to project from the hub of the roller-wheel, so as to surround the shaft and protect the bearing from dirt and dust in combination with the cup. All the parts of the roller-wheel may be made of iron or other suitable materials. The size and proportions of the various parts in the combination of this roller-wheel may be varied as circumstances require, and otherwise made to fit the roller and beams.

I construct the roller-wheel itself with a rim or flange, $f$, and with spokes $s\ s\ s\ s$, in the common size and form for ploughs and cultivators, which would be ordinarily about six to eight inches in diameter, and with the flange $f$ about two inches wide. The shafts or axles $a\ a$ form a part of the roller, (although they may be in a separate piece or pieces properly fastened,) and at the inner end such shafts are protected somewhat by the projecting edges E E. It is better to make the shafts with slight shoulders, $c\ c$, so that between that and similar shoulders on the inside of the cups C C there may be space for a ring or washer of leather or other material for packing in the usual manner when desired, and thus still more effectually keep out the dust and dirt. I make the thimble-shaped cups C C about three inches long, one end closed and the other open, so that they will easily fit upon the shafts $a\ a$ with shoulders $d\ d$ on the inside, at a suitable distance, say half an inch from the corresponding shoulders $c\ c$ on the shafts $a\ a$, for the purpose of using a packing, if that is desired, as above stated. These shoulders are not absolutely essential, however, upon either the shafts or cups, and they may be made so that the shafts will easily fit the inside of the cups the whole length of them, and operate like a common friction-cone. I consider it better, too, to make the cups C C a little flaring toward their open end, so that they will snugly fit under the projecting edges E E, and hinder the ingress of dust and dirt, and discharge what may pass into the cups. I make the cups C C with keys $b\ b$ on the sides, to fit into key-seats on the inside of the coupling-holes $g\ g$ of the segment-frames B B, or they may be held in any other common manner. Thus the cups hold the ends of the shafts, and they are held in the coupling-holes of the segment-frames. I make the segment-frames B B with the arms $v\ v$, between which are the short segments $h\ h$, and the arms $v\ v$ are so made that, from a point near the under side of the lower segments $h\ h$ to the top of the arms, they run parallel to each other, and the short segments $h\ h$ are also made to run parallel to each other. From the under side of the lower segments $h\ h$ the arms curve gradually, and finally meet together in the head for coupling-holes $g\ g$, which are made with a bearing on the inside broad enough to hold them steady, and so as to fit over and upon the cups C C, and snugly against the shoulders $i\ i$ on the outside of the cups. The coupling-holes $g\ g$ are also furnished with the key-seats $t\ t$ to receive the keys $b\ b$ on the cups and hold them to their place. By moving the keys from seat to seat, a different bearing is produced, and the use of the cup prolonged. A different bearing is also effected when the roller is changed from one of said implements to the other.

When the segment-frame is applied to cultivators the central pivot will be in the upper short segments $h\ h$, at the hole $p$, and both the arms and segments will be furnished with bolting-holes about three-eighths of an inch in diameter and about three-fourths of an inch apart. When applied to ploughs, the arms $v\ v$ are made to rise or fall together.

The segment-frames ordinarily stand about two and three-quarter inches apart, to meet the common size of wood beams in ploughs or cultivators, but when iron is used instead of wood, the segment-frame will be bent above the wheel to fit the same.

What I claim as my invention, and desire to secure by Letters Patent, is—

1. The segment-frames B B and the cups C C, when applied to a roller-wheel for ploughs and cultivators, each separately and in combination with each other, substantially as and for the purposes described.

2. I also claim the same parts in combination with the roller-wheel A, operated upon the shafts $a\ a$, substantially as and for the purposes described.

LEMAN B. PITCHER.

Witnesses:
    N. B. SMITH,
    C. W. SMITH.